US007072973B1

(12) United States Patent
Newson et al.

(10) Patent No.: US 7,072,973 B1
(45) Date of Patent: Jul. 4, 2006

(54) DATA TRANSMISSION USING COMMON SLIDING WINDOW

(75) Inventors: Paul E. Newson, Bellevue, WA (US); Aaron W. Ogus, Kirkland, WA (US); Roderick M. Toll, Sammamish, WA (US); Michael J. Narayan, Seattle, WA (US); Evan J. Schrier, Fall City, WA (US); James M. Boswell, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 987 days.

(21) Appl. No.: 09/884,634

(22) Filed: Jun. 19, 2001

(51) Int. Cl.
 *G06F 13/00* (2006.01)
(52) U.S. Cl. .................................................. 709/232
(58) Field of Classification Search ................ 709/230, 709/231, 232; 340/465, 470
 See application file for complete search history.

(56) References Cited

U.S. PATENT DOCUMENTS 5,307,351 A * 4/1994 Webster ...................... 370/470

OTHER PUBLICATIONS

Ke, Jun et al., "Towards a Rate-Based TCP Protocol for the Web," *Proceedings 8th International Symposium on Modeling, Analysis and Simulation of Computer and Telecommunications Systems (Cat. No. PR00728)*, 2000, 36-45.

Jouaber, B. et al., "Modeling the Sliding Window Mechanism," *ICC '98. 1998 IEEE International Conference on Communications*, 1998, 3(3), 1749-1753.

Kumar, Sanjeev et al., "The Sliding-Window Approach to High Performance ATM Switching for Broadband Networks," *IEEE Gobecom 1996. Communications: The Key to Global Prosperity*, 1996, 771-777.

Rizzo, L., "pgmcc: a TCP-friendly single-rate multicast congestion control scheme," *Computer Communication Review*, 2000, 30(4), 17-28.

* cited by examiner

*Primary Examiner*—Robert B. Harrell
(74) *Attorney, Agent, or Firm*—Woodcock Washburn LLP

(57) ABSTRACT

A networking protocol that supports the sending of reliable and non-reliable data in a common sliding window. Data to be transmitted according to the protocol is packaged into packets, where each packet has a header. Each packet carries a sequence number in the header, where the sequence numbers are successively assigned to each outgoing packet. As the packets are received, the recipient of the packets keeps track of the sequence numbers of received packets to determine whether any packets are missing and selectively acknowledges those packets that have been received. The selective acknowledgment is performed using a mask, where each bit in the mask indicates the presence or absence of a packet as an offset from a reference value. Based on the mask, the sender re-sends non-received reliable packets, and creates a second mask which indicates non-reliable non-received packets that will not be re-sent.

22 Claims, 10 Drawing Sheets

DATA TRANSMISSION USING COMMON SLIDING WINDOW

FIELD OF THE INVENTION

The present invention relates to the field of computer networking. More particularly, the present invention provides a window-based network protocol in which reliable and non-reliable data may be sent in the same sliding window.

BACKGROUND OF THE INVENTION

In a computer network where data is sent from point A to point B, it is often desirable to send data both reliably and non-reliably. Data that is sent reliably from point A is guaranteed to reach point B; this guarantee is generally implemented by requiring point B to acknowledge receipt of the data. Data that is sent non-reliably from point A is not guaranteed to reach point B. Reliable data has the obvious advantage that its delivery can be assured, but it also has the disadvantage that acknowledging receipt is costly of resources and decreases the throughput of the system. If non-delivery of data can be tolerated, then non-reliable delivery is generally more efficient.

One technique for sending both reliable and non-reliable data is to use two different protocols—e.g., the Transport Control Protocol ("TCP") for reliable data, and the User Datagram Protocol ("UDP") for non-reliable data. For example, a computer system may send some type of crucial data (e.g., player position updates in a video game, etc.) via TCP, and may send data whose non-receipt can be tolerated (e.g., audio packets, etc.) via UDP. A problem with such an arrangement is that when the total volume of data to be sent approaches or exceeds the capacity of the network connection, the network tends to become swamped with the TCP traffic, while no UDP traffic gets through. Since the TCP and UDP protocols operate independently and do not share status information with each other, they are unable to "tune" their throughput relative to each other in order to balance the traffic.

Another problem that arises in the use of reliable data delivery is in the way that reliable protocols acknowledge receipt, which tends to decrease the throughput of the system. Conventionally, reliable protocols use a "ping-pong" technique, wherein the sender sends a message and then waits for an acknowledgment before sending another message. This technique delays traffic because the sending and acknowledging of each message incurs a round-trip latency of twice the transmission time between the sending and receiving nodes. Improvements to this technique include the "burst" protocol and the "windowing" protocol. In a burst protocol, plural messages are sent, and a single acknowledgment is sent of all the messages in the "burst." This technique cuts down on round-trip latency, since it is not necessary to wait for an acknowledgment for every message—only every second, third, or fourth message, etc. In a windowing protocol, data is sent continuously, but transmission is stopped if transmission of data gets ahead of acknowledgments by a specified "window" (i.e., a specified amount of data or number of packets). If receipt of data is not acknowledged, all data sent subsequently to the non-acknowledged data must be resent since there is no way to identify which data was lost and which data was received. Moreover, windowing protocols do not presently provide a way to send reliable and non-reliable data in the same window.

In view of the foregoing, there is a need for a network protocol that overcomes the limitations and drawbacks of the prior art.

SUMMARY OF THE INVENTION

The invention provides a network transport protocol that permits the sending of reliable and non-reliable data in the same sliding window. Data to be sent is packaged into frames. Each frame includes a protocol header that indicates, among other things, whether the data is reliable or non-reliable. Each frame also includes a sequence number, which indicates the order in which the frames are sent. The sender then sends the frame to a recipient over an appropriate communications network (e.g., IPX, UDP, modem, etc.) The communications network that is used to send the frame may comprise any network layer that is capable of providing at least non-reliable data delivery. A protocol engine is used to send and receive data according to the transport protocol of the present invention.

The recipient receives frames from the sender. Periodically, the recipient determines whether any frames in the sequence of received frames are missing. If no frames are missing, then the recipient sends the sender an acknowledgment indicating the highest frame number received. If frames are missing from the received sequence, then the recipient sends the sender a control message that selectively acknowledges those frames that were received, and indicates which frames are missing from the sequence. When the sender receives such a selective acknowledgment, the sender determines whether the missing frame(s) were reliable or non-reliable frames. If the frame was sent reliably, then the sender retransmits the frame(s). If the frame(s) were sent non-reliably, then the sender sends a control message indicating that the missing frame(s) will not be re-sent. Preferably, the control messages use masks to indicate the particular frames that are missing (as well as the particular frames that will not be re-sent because they were unreliable).

In a preferred embodiment, the protocol header also includes an indication of whether the frame contains sequential or non-sequential data. Sequential data is data that must be delivered in the order in which it was sent. Non-sequential data is data that can be delivered without regard to the order in which it was sent. The protocol provided by the invention supports both sequential and non-sequential frames. Since frames may indicate independently whether they are reliable/non-reliable, as well as sequential/non-sequential, the protocol supports frames having any of the four possible combinations of reliable vs. non-reliable and sequential vs. non-sequential.

Other features of the invention are described below.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF THE INVENTION

Overview

Network communications may be performed with the use of a protocol engine. A protocol engine is a software tool that negotiates the sending and receiving of communication over a computer network. Through the use of a protocol engine, a software application that needs to send or receive information over a computer network need not contain logic to negotiate the intricacies of the network; such an application merely issues calls to the protocol engine, which negotiates the details of the communication in a manner that is relatively transparent to the application.

Some of the communication issues that are managed by a protocol engine include: the sequencing of data (i.e., the delivery of data in a sequence that reflects the order in which it was sent); the organization of data into packets; and the reliable transmission of data (i.e., implementation of a scheme that verifies that sent data has actually been received at its destination). The protocol engine manages these issues by means of a "protocol," which is essentially a language that defines the format of data packets and packet headers, as well as a series of messages that transmit bookkeeping information for the protocol engine, such as an "acknowledgment" that reliably-transmitted data has been received. One feature of a protocol engine may be "sliding window" which defines the amount of data or number of packet by which the sending of reliable data may precede the acknowledgment of such data.

The present invention provides a protocol that supports the sending of both reliable and non-reliable data in the same sliding window, and that also supports the intermixing of sequenced and non-sequenced data.

Exemplary Computing Environment

Figure 1:
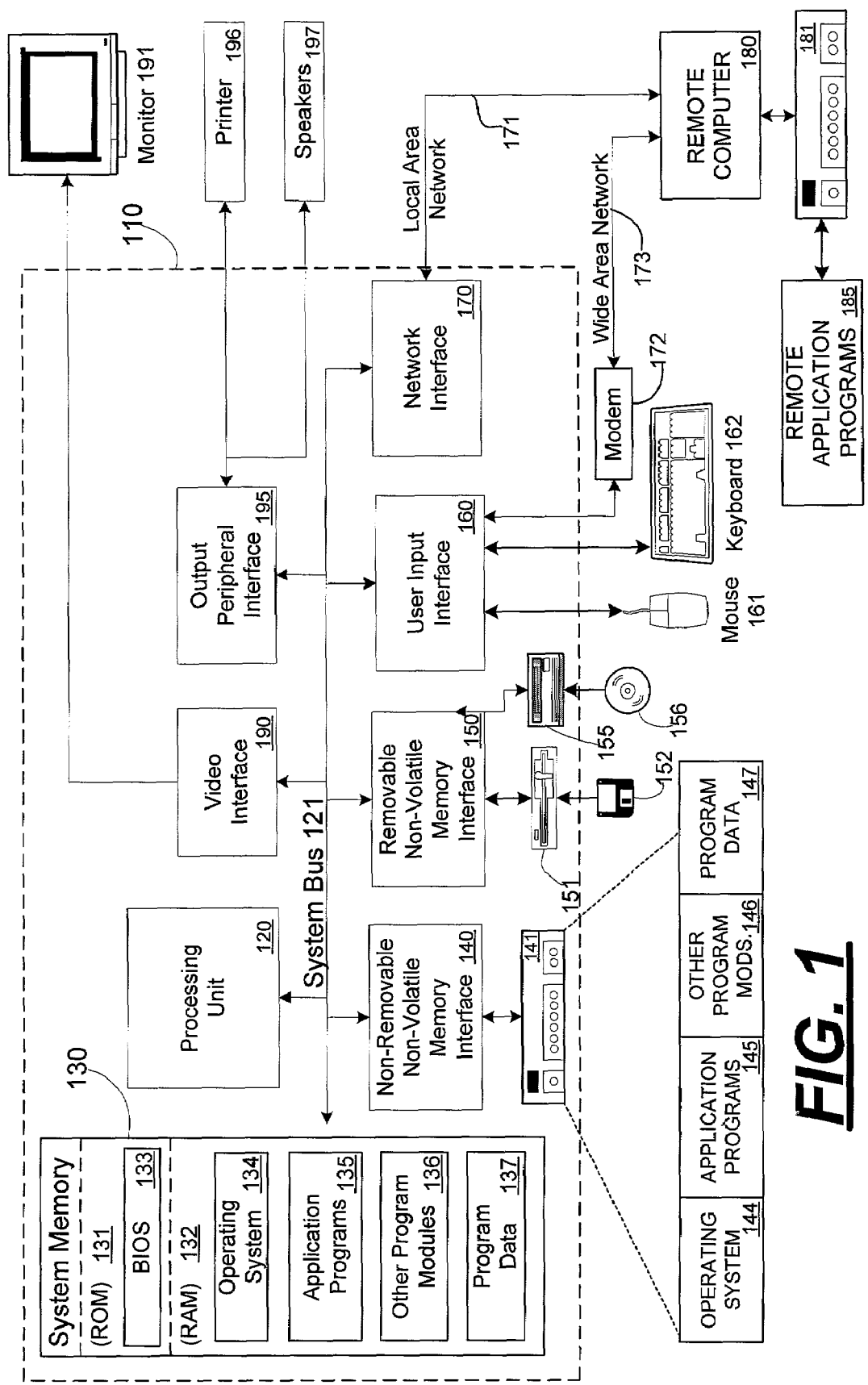
FIG. 1 is a block diagram of an exemplary computing environment in which aspects of the invention may be implemented.

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Exemplary Protocol Engine

A networking "protocol" defines a format for the exchange of data between computing devices, as well as various "handshaking" operations that support the protocol. A protocol may provides various features and services, such as reliable data delivery (i.e., delivery of data in a manner that assures the sender that the recipient has received it), sequenced data delivery (i.e., delivery of data in a manner such that it will be provided to the recipient in the order in which it was sent by the sender), and perhaps other features such as a session topology (e.g., client/server, peer-to-peer, etc.).

The protocol is carried out by a "protocol engine." A protocol engine is a software component that executes on each computing device that participates in communications according to the protocol. Typically, the protocol engine exposes an interface (i.e., a set of methods) that allow it to interact with other components on the computing device. For example, the protocol engine may expose a "send" method that accepts, for example, data and a destination as parameters. An application that sends data may call the "send" method, providing the data and its destination as parameters to the method, and the protocol engine negotiates the actual sending of data. The application may be able to specify various options, such as reliable vs. non-reliable sending of the data, sequenced vs. non-sequenced sending of data, etc. These options may be specified either by using different methods in the interface (e.g., the interface may expose a "reliable-send" method as well as a "non-reliable-send" method, or a generalized "send" method may accept a parameter indicating reliable or non-reliable delivery). Similarly, an interface which includes methods may be used by the application in order to receive data—either the protocol engine may expose a "receive" method that is periodically polled by the application, or the application may expose a method that the protocol engine calls to notify the application that data destined for the application has been received.

Figure 2:
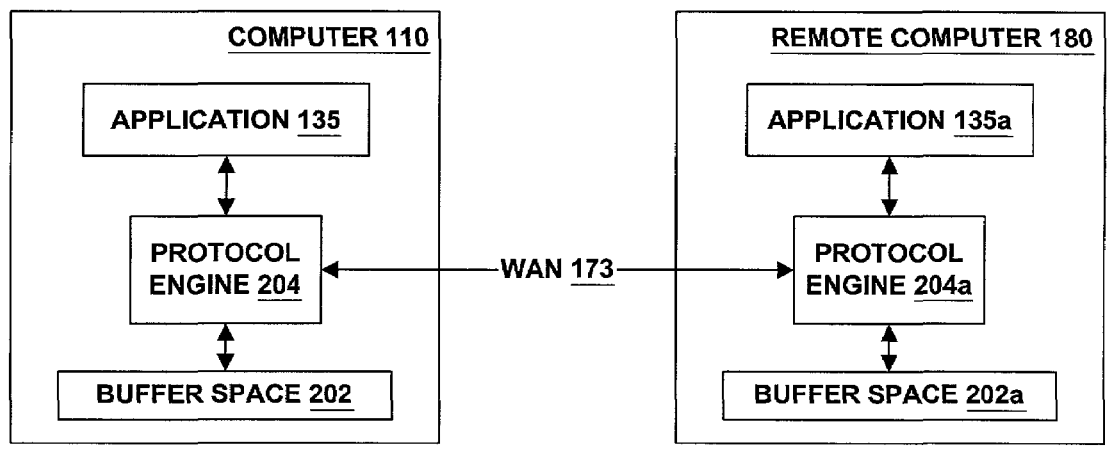
FIG. 2 is a block diagram of a protocol engine incorporated in a plurality of computing devices communicatively connected by a computer network.

FIG. 2 shows an exemplary computing arrangement that incorporates a protocol engine. Computer 110 and remote computer 180 are linked by wide-area network 173. Wide area network 173 may, for example, be or comprise the network known as the Internet. Protocol engine 204 is a software component that executes on computer 110. Protocol engine 204a is a software component that executes on remote computer 180. Protocol engines 204 and 204a may, in fact, be the same software executing on the respective computing devices 110 and 180. Protocol engine 204 may access buffer space 202. Buffer space 202 is used, among other things, for saving sequenced packets that have been received out-of-order, as more particularly described below in connection with FIG. 13. Likewise, protocol engine 204a may access buffer space 202a. Buffer space 202 may comprise any data storage or memory means, such as RAM 132 or hard disk 141 (shown in FIG. 1). Likewise, buffer space 202a may comprise any analogous data storage means that may be present on remote computer 180.

Application 135 communicates with protocol engine in order to send and receive data according to the protocol. As described above, protocol engine 204 and/or application 135 may, for example, expose an interface comprising a set of methods that are used to send and receive data. Likewise, on remote computer 180, application 135a and protocol engine 204a may communicate through one or more interfaces that comprise a set of methods.

Windowing Protocols

A protocol engine may transmit data over a computer network either reliably or non-reliably. Non-reliable data is data that is sent by the sender's protocol engine with no guarantee that it will ever reach the recipient's protocol engine. Reliable data is data that is guaranteed to reach the recipient's protocol engine. Typically, the reliable transmission of data is implemented using a set of messages called "acknowledgments." That is, when reliable data is transmitted by the sender's protocol engine, the recipient's protocol engine sends the sender's protocol engine a message that acknowledges the receipt of the data. If no acknowledgement is received by the sender, the sender re-transmits the data to the recipient. This cycle of re-transmission continues until an acknowledgment of the data is received.

One technique for implementing reliable data is for the sender to send one packet of data at a time (or, in a stream protocol such as TCP, a defined payload of data), and wait for an acknowledgment before sending the next packet. This technique is called "ping-pong," because transmission alternate between sender and recipient. A "ping-pong" technique, while effective, can be very slow. Each successive packet must wait to be sent until an acknowledgment of the previous packet is received, and the amount of time that it takes to receive this acknowledgment is determined by the transmission time between the sender and recipient (referred to as the "round-trip latency"). Another technique for implementing reliable data is the "burst" protocol. In a burst protocol, a defined number of packets can be sent without receiving an acknowledgment; once that defined number is reached, the sender waits for an acknowledgment of all sent packets before sending additional packets. This technique increases throughput as compared with the "ping-pong" technique because it reduces the number of acknowledgments that the sender must wait for. However, since some waiting is still involved, the "burst" protocol still incurs a round-trip latency.

A third technique for implementing reliable data is the "window" protocol. In a window protocol, data is sent and acknowledged continuously. The protocol permits the sending of data a defined number of packets (or, in the case of a stream protocol, a defined amount of data) ahead of the receipt of acknowledgments. The number of packets (or amount of data) that the sending is allowed to "get ahead" of the acknowledgments is called the size of the "window."

Figure 3:
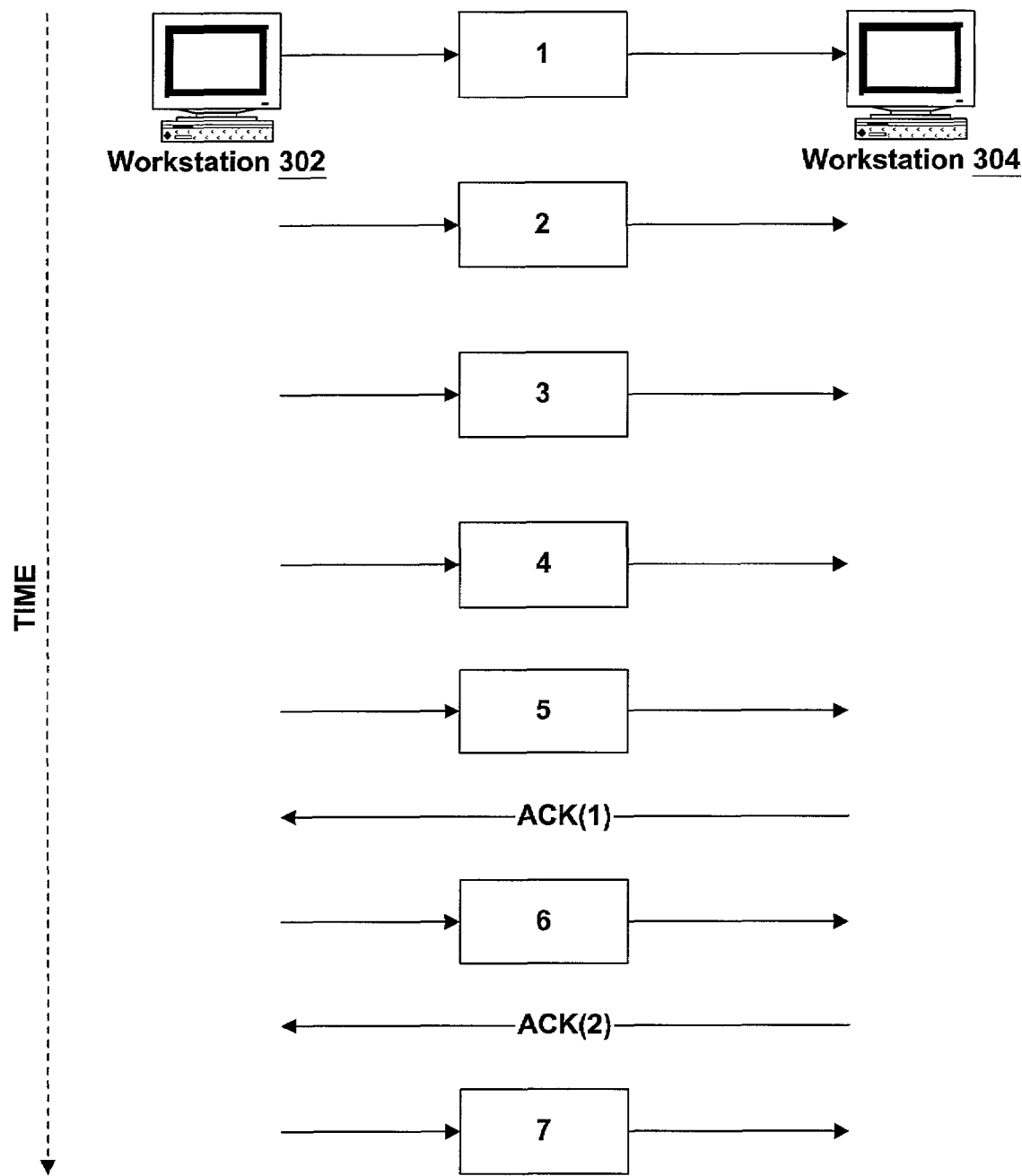
FIG. 3 is a diagram of packet transmission using a windowing protocol.

FIG. 3 shows an example of a window-based protocol, where the size of the window is five packets. Workstation 302 is the sender of data, and workstation 304 is the recipient of that data. The protocol at workstation 302 sends packets one through five to workstation 304. After packet five is sent, transmission ceases, until workstation 302 receives an acknowledgment. Subsequently, workstation 302 receives an acknowledgement of packet one. At this point, workstation 302 may send packet six to workstation 304, but then must wait for another acknowledgement before sending any more packets. Workstation 302 subsequently receives an acknowledgment of packet two, so workstation 302 sends packet seven. So long as the number of packets sent does not exceed the number of packets acknowledged by more than the size of the window, transmission of packets may proceed without interruption. Depending on the size of the window chosen, round-trip latency may be reduced or completely eliminated.

Figure 4:
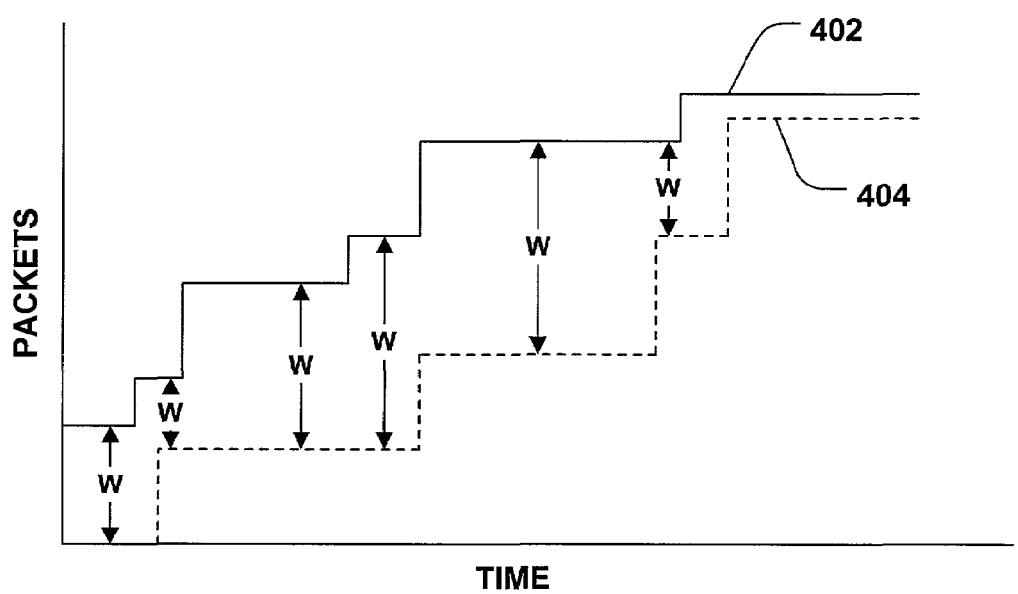
FIG. 4 is a diagram showing the sending and acknowledging of packets through the progression of time.

The difference between the number of packets sent and the number of packets acknowledged may increase or decrease, depending on factors such as network conditions, although the difference between these two number is capped by the maximum window size. FIG. 4 demonstrates a window as a graph showing packets versus time. Solid line 402 represents the number of packets sent, and dashed line 404 represents the number of packets for which an acknowledgment has been received by the sender. It will be observed that the number of packets acknowledged never exceeds the number of packets sent. At any given time, the interval between line 402 and line 404 is the window W, and W never exceeds the maximum window size. It will be recognized by those of skill in the art that the maximum window size may by dynamically adjusted or "tuned" to account for varying network conditions; such adjustment techniques are conventional in the art. A window is sometimes described as a "sliding" window because the differential between packets sent and packets acknowledged "slides" forward through sequence of packets, although the differential remains capped by the maximum window size.

As noted above, acknowledgments relate to the reliable transmission of data. Since non-reliable data is not acknowledged, it is difficult to mix reliable and non-reliable data in the same protocol, since some data will need to be acknowledged, and other data will not. The present invention provides a sliding window protocol that allows both reliable and non-reliable data to be sent in the same sliding window.

Packet Structure

Figure 5:
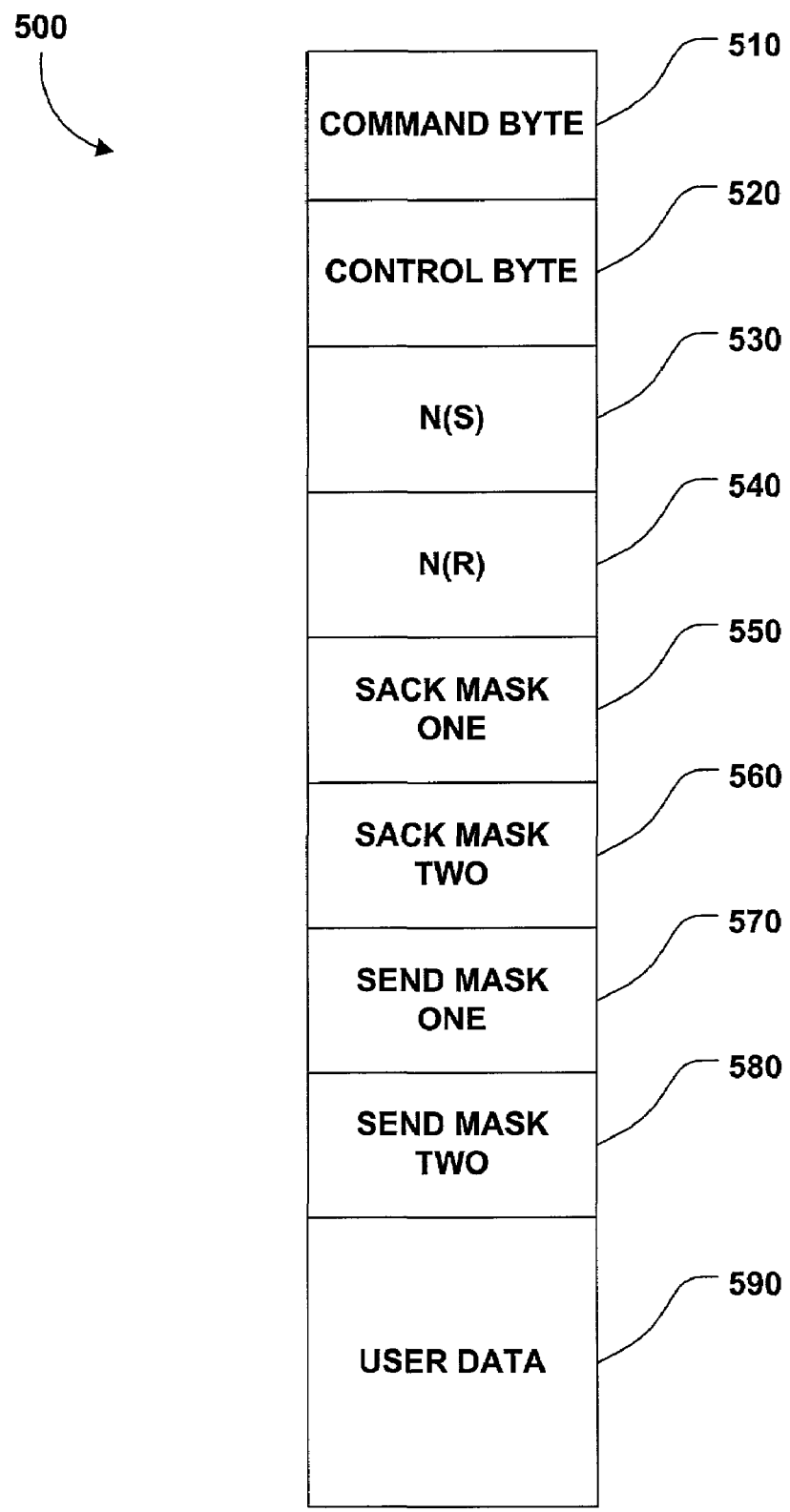
FIG. 5 is a block diagram of an exemplary packet data structure in accordance with the invention.

FIG. 5 shows an exemplary data structure for a packet 500. Packet 500 includes: a command byte 510; a control byte 520; a sequence number 530 (typically written as N(S)); a number 540 which indicates the sequence number of the next packet expected to be received (typically written as N(R)); first and second selective acknowledgment ("SACK") masks 550 and 560; first and second send masks 570 and 580; and user data 590.

Command Byte 510

Figure 6:
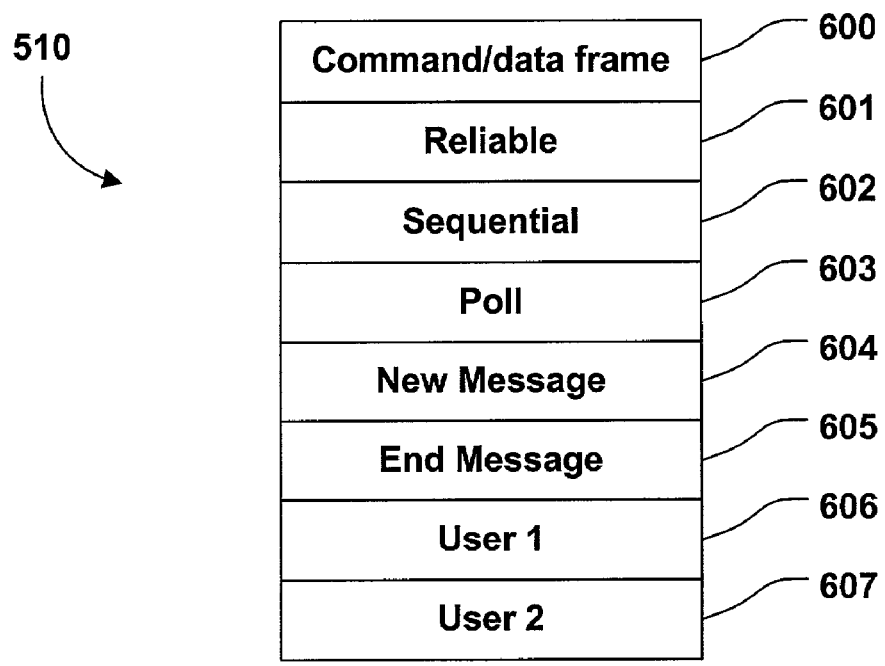
FIG. 6 is a block diagram of an exemplary command byte for the packet data structure of FIG. 5.

The detail of an exemplary commend byte 510 is shown in FIG. 6. Exemplary command byte 510 includes eight separate one-bit values: a command/data frame bit 600; a reliable bit 601; a sequential bit 602; a poll bit 603; a new-message bit 604; an end-message bit 605; and two user bits 606 and 607.

Command/data frame bit 600 indicates whether the current packet is a command frame or a data frame (e.g., zero for command, one for data). A data frame contains user data that is being transmitted from one point in a network (e.g., wide area network 173) to another point. A command frame contains internal data that is used by the networking protocol itself.

Reliable bit 601 indicates whether the packet is being transmitted reliably or not reliably. A "reliable" packet is one that will be retransmitted by the sender until the recipient acknowledges that the packet has been received. A "non-reliable" packet, on the other hand, is a packet that will not be retransmitted, regardless of whether the packet is received by the recipient.

Sequential bit 602 indicates whether the packet is a sequenced or non-sequence packet. The protocol will not present "sequenced" packets out-of-order. That is, if a sequenced packet arrives out-of-order, the protocol buffers the packet until all of the preceding sequenced reliable packets have been received, and all preceding sequenced non-reliable packets have been received or accounted for. (The concept of non-reliable packets being "accounted for" without being received is discussed in further detail below.) Thus, when an application uses the protocol for network communication, it will never have to process sequenced packets out-of-order. "Non-sequenced" packets are presented to the calling layer in the order in which they are received, even if the packets are presented in an order different from that in which they were sent.

Poll bit 603 indicates whether the packet is to be acknowledged immediately. If poll bit 603 is set, receipt of the packet triggers an immediate acknowledgment. Otherwise, the protocol determines when to send an acknowledgment.

New message bit 604 indicates whether the current packet is the first or only frame of a message. End message bit 605 indicates whether the current packet is the last or only frame in a message. A "message" is a unit of data that spans multiple frames; new message bit 604 and end message bit 605 are used to delimit such a multiple frame message. User bits 606 and 607 are set by the layer that calls the networking protocol.

Control Byte 520

Figure 7:
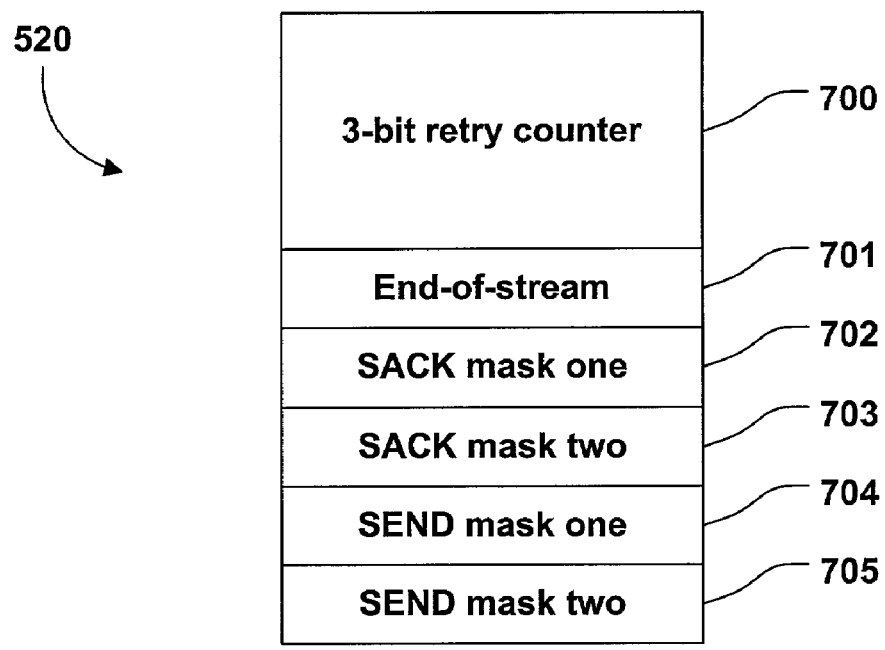
FIG. 7 is a block diagram of an exemplary control byte for the packet data structure of FIG. 5.

The detail of exemplary control byte 520 is shown in FIG. 7. Exemplary control byte 520 includes: a three-bit retry counter 700; an end-of-stream flag 701; flags 702 and 703 indicating the presence of up to two SACK masks (discussed below); and flags 704 and 705 indicating the presence of up to two SEND masks (discussed below).

Retry counter 700 is a three-bit integer (representing unsigned values from zero through seven), which indicates the number of times that the current packet has been re-sent. End-of-stream flag 701 indicates that the current packet is the last packet that will be sent by the sender. Flags 702 and 703 indicate the presence of up to two SACK masks, as described below. A packet may have either zero, one, or two SACK masks. If a packet has no SACK masks, then neither of flags 702 or 703 is set. If a packet has one SACK mask, then either flag 702 or 703 is set to indicate the presence of either the first or second SACK mask. (As discussed below, the first and second SACK masks are used to indicate the non-receipt of certain packets as an offset from a reference value called N(R). The first 32 packets ahead of N(R) are represented by the first SACK mask, and the next 32 packets ahead of N(R) are represented by the second SACK mask. Thus, if all of the non-received packets to be represented in a SACK mask are more than 32 packets ahead of N(R), then a packet would include a second SACK mask but not a first SACK mask.) If a packet has two SACK masks, then flags 702 and 703 are both set. Flags 704 and 705 are analogous to flags 702 and 703, except that flags 704 and 705 indicate the presence of zero, one, or two SEND masks. SACK masks and SEND masks are more particularly described below.

Sequence Number 530

Returning to FIG. 5, the next component of packet 500 following control byte 520 is the sequence number 530 of the packet (written as "N(S)" which stands for "next send"). Each packet is preferably assigned a sequence number in a defined order—i.e., the first packet that a sender sends to a particular recipient has N(S)=0, the second packet has N(S)=1, etc. (It will be understood that the use of zero as the sequence number for the initial packet in a session is an arbitrary choice; the first packet in a session can be assigned any sequence number.) Sequence number 530 is preferably an eight-bit unsigned value between zero and 255. Sequence numbers "wrap" to accommodate sessions that have more than 256 packets. It should be noted that the eight-bit sequence number is advantageous as compared with the 32-bit sequence numbers used by some protocols, such as the Transport Control Protocol (TCP), because it allows a smaller packet-size to be achieved. TCP is a stream-based protocol, where the sequence number is incremented based on the payload of variably-sized frames, rather than the number of frames transmitted. In other words, in TCP, the sequence number represents the number of bytes that have been transmitted, rather than the number of packets, and the number of bytes may be very large. Typically, the maximum window size should not exceed half the "sequence space" (i.e., the cardinality of the range of values that can be used as sequence numbers). Thus, defining the window and the sequence number in terms of the number of bytes transmitted generally requires a wide sequence space in order to support a sufficiently large window size. Using the sequence number to represent a number of packets transmitted rather than a number of bytes, therefore, generally reduces the width of the required sequence space (e.g., eight bits, instead of the 32 bits used in TCP).

Number Received (N(R)) 540

The next component of packet 500 is a number 540 called N(R) ("next received"). N(R) represents the sequence number of the next packet that the recipient expects to receive—that is, the number that is one more than the highest numbered packet up to which all preceding packets have been received or otherwise accounted for. This definition of N(R) accounts for the fact that the sender may receive packets out of sequence. For example, if the sender has received packets 1, 2, 3, and 6, then N(R) is equal to 4, because all packets up to 3 have been received or accounted for. Even though the sender has received packet 6, N(R) is not equal to 7 because not all packets preceding 7 have been received or accounted for. As further described below, a packet may be "accounted for" without having been received if the packet is a non-reliable packet that the sender has indicated will not be re-transmitted (which the sender may do through the use of a SEND mask, as described below).

SACK Masks 550 and 560

Figure 8:
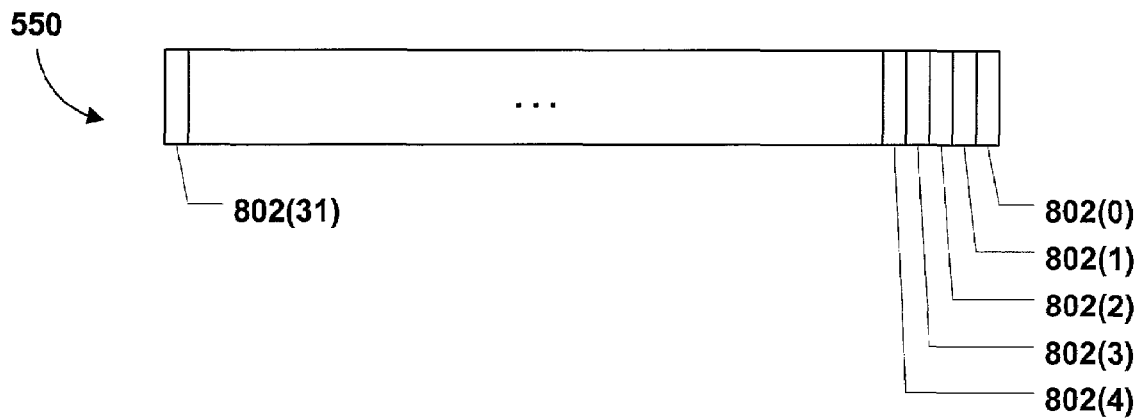
FIG. 8 is a block diagram of an exemplary mask for the packet data structure of FIG. 5.

Packet 500 may contain one or more SACK masks 550 and 560. In a preferred embodiment, packet 500 contains either zero, one, or two SACK masks, although it will be appreciated that the format of packet 500 may be modified to accommodate any number of SACK masks appropriate for the size of the window. Each SACK mask 550 and 560 is preferably a 32-bit word. The structure of such a SACK mask is shown in FIG. 8. Exemplary SACK mask 550 includes thirty-two bits 802(0) through 802(31). Each of bits 802(0) through 802(31) can be set or examined, by means that are known in the art.

SACK means "Selective ACKnowledgment," and SACK masks 550 and 560 are used to selectively acknowledge receipt of packets by indicating those packets that have not been received. The combination of N(R) 540 and SACK masks 550 and 560 selectively acknowledges receipt of packets according to the following rules:

All packets preceding N(R) have been received or accounted for.

The packet having number N(R) is implicitly assumed not to have been received.

For each bit in the SACK mask that has a value of one, the packet having sequence number N(R)+bit_offset+1 has not been received. (In other words, bit 802(0) has an "offset" of zero, so if bit 802(0) is set to one, then the SACK mask indicates that packet N(R)+0+1=N(R)+1 has not been received. Similarly, if bit 802(3) (having an offset of three) is set to one, this means that packet N(R)+3+1=N(R)+4 has not been received.)

At this point, the following observations are noted. First, it should be noted that there is no bit in SACK mask 550 that indicates that packet N(R) has not been received or accounted for; rather, this fact is indicated by the mere presence of SACK mask 550. The reason for this is as follows: if packet N(R) had been received or accounted for, then N(R) would have a higher value. For example, suppose that N(R) is equal to 15, indicating that all packets having sequence numbers from 0 through 14 have been received or accounted for. In this case, it must be true that packet 15 has not been received or accounted for. If packet 15 had been received or accounted for, then N(R) would be equal to 16 because all packets from 0 through 15 would have been received or accounted for. Thus, it is not necessary to use a bit in a SACK mask to indicate the non-receipt of packet N(R).

Second, it should be noted that the use of two SACK masks 550 and 560 allows packets to be identified whose sequence number are as much as 65 beyond the value of N(R). That is, since each SACK mask 550 and 560 preferably has 32 bits, the first SACK mask 550 can represent up to 32 packets (i.e., N(R)+2 through N(R)+33), and the second SACK mask 560 can represent an additional 32 packets (i.e., N(R)+34 through N(R)+65). Thus, when a packet is created, either one or two SACK masks can be included (and their presence indicated by flags 702 and/or 703 in control byte 520, as discussed above), depending upon how many packets beyond N(R) need to be indicated as missing. As discussed above, a preferred embodiment includes either zero, one, or two SACK masks, but it will be understood that a protocol in accordance with the invention may be designed to use any number or size of SACK masks, depending upon the number of packets beyond N(R) that need to be identified.

SEND Masks 570 and 580

Packet 500 may also contain one or more SEND masks 570 and 580. SEND masks 570 and 580 are essentially the "reply" to SACK masks 550 and 560. That is, when the sender receives a SACK mask from the recipient indicating that certain packets have not been received, the sender may create a SEND mask that indicates which of the non-received packets were non-reliable and thus do not need to be re-sent. The reason that the sender needs to reply in this fashion is that, when the recipient creates a SACK mask indicating non-received packets, the recipient has no way of knowing whether the non-received packets were reliable or non-reliable. Thus, the sender's reply to the recipient's SACK mask is either: (a) to re-send the specified packet (if it was a reliable packet); or (b) to create a SEND mask indicating that the packet was non-reliable and need not be re-sent.

Each SEND mask has the same structure as SACK mask 550 shown in FIG. 8—i.e., a plurality of individually settable bits. Preferably, a SEND mask has the same size as a SACK mask (i.e., 32 bits). Each bit in the SEND mask represent the sequence number of a packet in a manner similar to how such bits are used in the SACK mask—i.e., each bit represents the sequence number of a packet as an offset from N(S). For example, the lowest-order bit in the SEND mask (i.e., offset zero into the SEND mask) represent packet N(S)−1. (It should be observed that, since all packets to which a reply will be necessary will precede N(S), the SEND mask differs from the SACK mask in that it reaches backward from N(S) rather than forward from N(R). That is, the packet represented by a bit in the SEND mask is N(S)−bit_offset−1.) If a bit in the SEND mask is equal to one, the corresponding packet is non-reliable and will not be re-sent. Although packets that are identified in the SEND mask as non-reliable will not be re-sent, such packets are "accounted for" by the recipient. Reliable packets are not represented in the SEND mask; such packets are simply re-sent. Zeros in the SEND mask represent non-reliable packets that have been acknowledged and do not need to be re-sent, or non-reliable packets for which no determination to re-send has yet been made (i.e., packets that are presumed to be "in transit").

Data 590

Finally, packet 500 optionally includes data 590. Data 590 is included in packet 500 if the packet is a data packet, as opposed to a control packet, as indicated by command/data frame bit 600.

Process of Receiving and Acknowledging Packets

Figure 9:
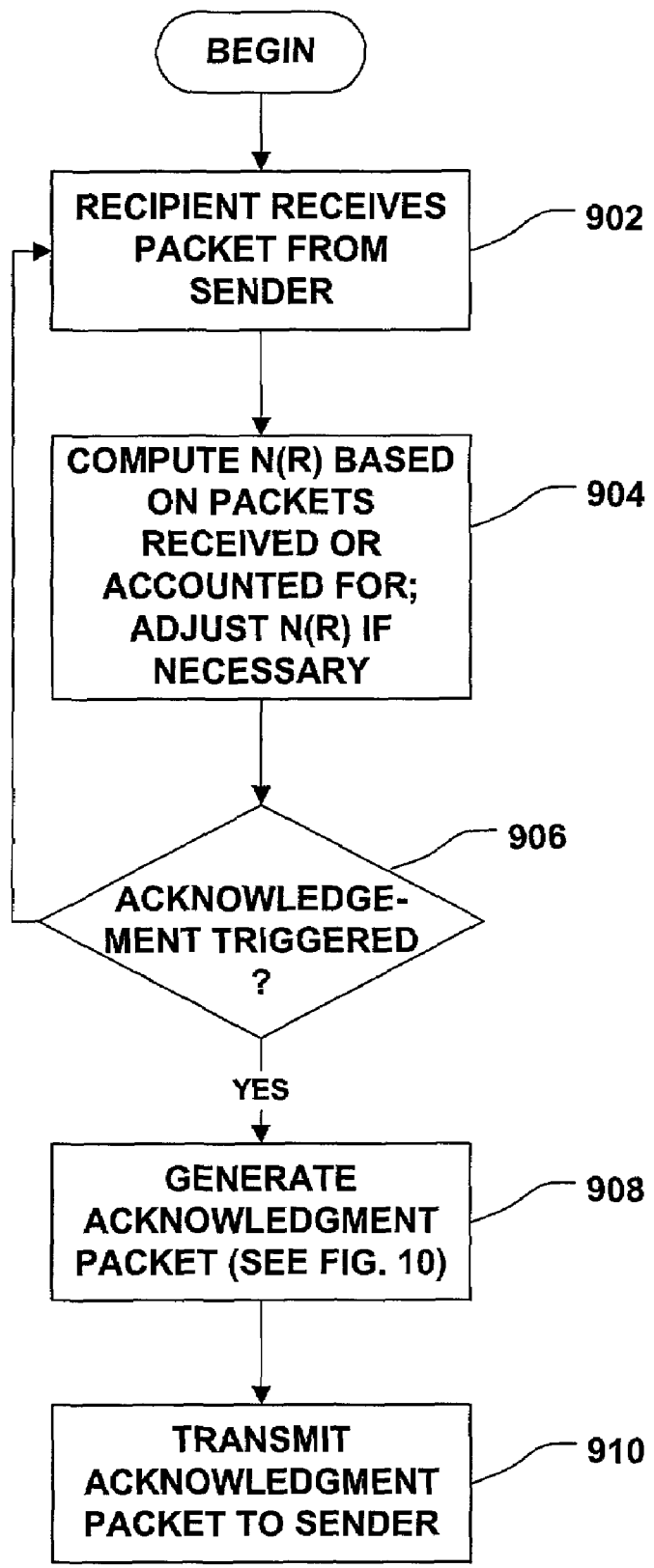
FIG. 9 is a flow diagram of an exemplary process of receiving and acknowledging packets.

FIG. 9 shows an exemplary process carried out by the recipient of information according to the protocol of the present invention. The recipient receives packets 500 from the sender and generates an acknowledgment based on the header information in the received packet(s).

At step 902, the recipient receives a packet 500, which preferably has the format shown in FIG. 5 discussed above. The packet may contain various information, including, but not limited to, a sequence number 530 and one or more SEND masks 570 and 580.

As discussed above, the recipient maintains a value N(R), which indicates the sequence number of the next packet that the recipient expects to receive. The sequence number 530 contained in the packet, as well as the SEND masks 570 and 580, may provided a basis to update N(R). At step 904, the value of N(R) maintained by the recipient is computed based on the sequence number 530 and send masks 570 and 580 of the received packet. For example, if packets have been received out of order, there may be a "gap" in the record of received packets, and sequence number 530 may indicate that the received packet fills this "gap." On the other hand, SEND masks 570 and 580 may account for some missing packets by indicating that these missing packets are non-reliable. Based on the sequence number 530 of the received packet and the information contained in SEND masks 570 and 580, the recipient determines the highest sequence number up to which all packets have been received or accounted for, and adjusts N(R) accordingly. It will be observed that N(R) may not actually change as a result of the computation at step 904—i.e., after receiving a packet and using the SEND mask(s) to account for non-received packets, there may still be packets preceding N(R) that have not been accounted for, in which case the value of N(R) does not change.

At step 906, a determination is made as to whether an acknowledgment is to be sent. It will be understood that in a sliding window protocol, it is not necessary for the recipient to send an acknowledgment upon receipt of every packet, but there may be a trigger that causes an acknowledgment to be sent with sufficient frequency that the number of unacknowledged packets at the sender is not likely to exceed the maximum size of the window. For example, the recipient may send an acknowledgment every n packets, or may send an acknowledgment if a packet has not been received for a pre-determined number of milliseconds, or the acknowledgment information may be sent in the header of a data packet the next time that the recipient sends such a data packet to the sender. Any such acknowledgement trigger is within the spirit and scope of the invention. If it is determined at step 906 that an acknowledgment is not triggered, then the process returns to step 902 to receive the next packet. If an acknowledgment is triggered, then the process continues to step 908.

At step 908, a packet containing acknowledgment information is generated. The information that is relevant for the acknowledgment is: (a) a value for N(R); and (b) one or more optional SACK masks. As discussed above, this information is located in the header of packet 500, and may be included either in a control packet (i.e., a packet that contains only internal information used by the protocol), or in a data packet (i.e., a packet that carries user data). The process of generating the acknowledgment information to be included in a packet is described below in connection with FIG. 10. Once the acknowledgment packet has been generated, the recipient transmits the acknowledgment packet to the sender at step 910.

Process of Generating Acknowledgment Information

Figure 10:
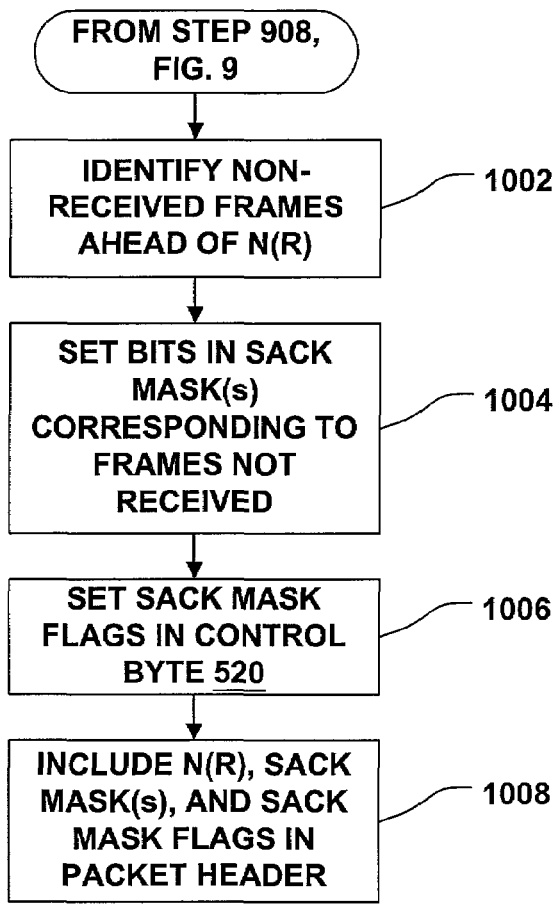
FIG. 10 is a flow diagram of an exemplary process of creating selective acknowledgment information for inclusion in an acknowledgment packet.

FIG. 10 shows an exemplary process whereby a packet recipient generates acknowledgment information for inclusion in a packet. At step 1002, those frames between N(R) and N(S) are identified that have not been received or otherwise accounted for. (It will be recalled that N(S) is the sequence number of the highest-numbered packet that the sender has sent to the recipient, and N(R) is the highest sequence number up to which all packets have been received or accounted for.)

At step 1004, the bits in SACK masks 550 and 560 are set which correspond to the non-received packets between the recipient's value for N(R) and the sender's value for N(S). As described above, a preferred technique for using the bits of SACK masks 550 and 560 is for an offset of a bit into a mask to represent a particular offset from N(R) (e.g., bit 0 in SACK mask 550 corresponds to the packet with sequence number N(R)+1, bit 1 corresponds to the packet with sequence number N(R)+2, etc.). As further described above, no bit in SACK masks 550 and 560 represent N(R) itself, because it is implicit that packet N(R) has not been received. In a preferred embodiment, a single SACK mask is 32 bits long and can represent packets N(R)+1 through N(R)+32. Thus, it may be possible to use only one SACK mask. For example, if none of the packets beyond N(R)+32 have been received, then this fact may be implied by the absence of a second SACK mask 560.

At step 1006, SACK mask flags 702 and/or 703 are set in control byte 520, to indicate that either one or two SACK masks are present in the packet header. At step 1008, the current value of N(R), the SACK masks 550 and/or 560, and the control byte with the appropriate SACK mask flags are included in the header of a packet that will be sent by the recipient to the sender. This packet will contain sufficient information to identify to the sender those packets that the recipient has not received, and thus serves to "selectively acknowledge" the receipt of packets.

Processing a SACK Mask

Figure 11:
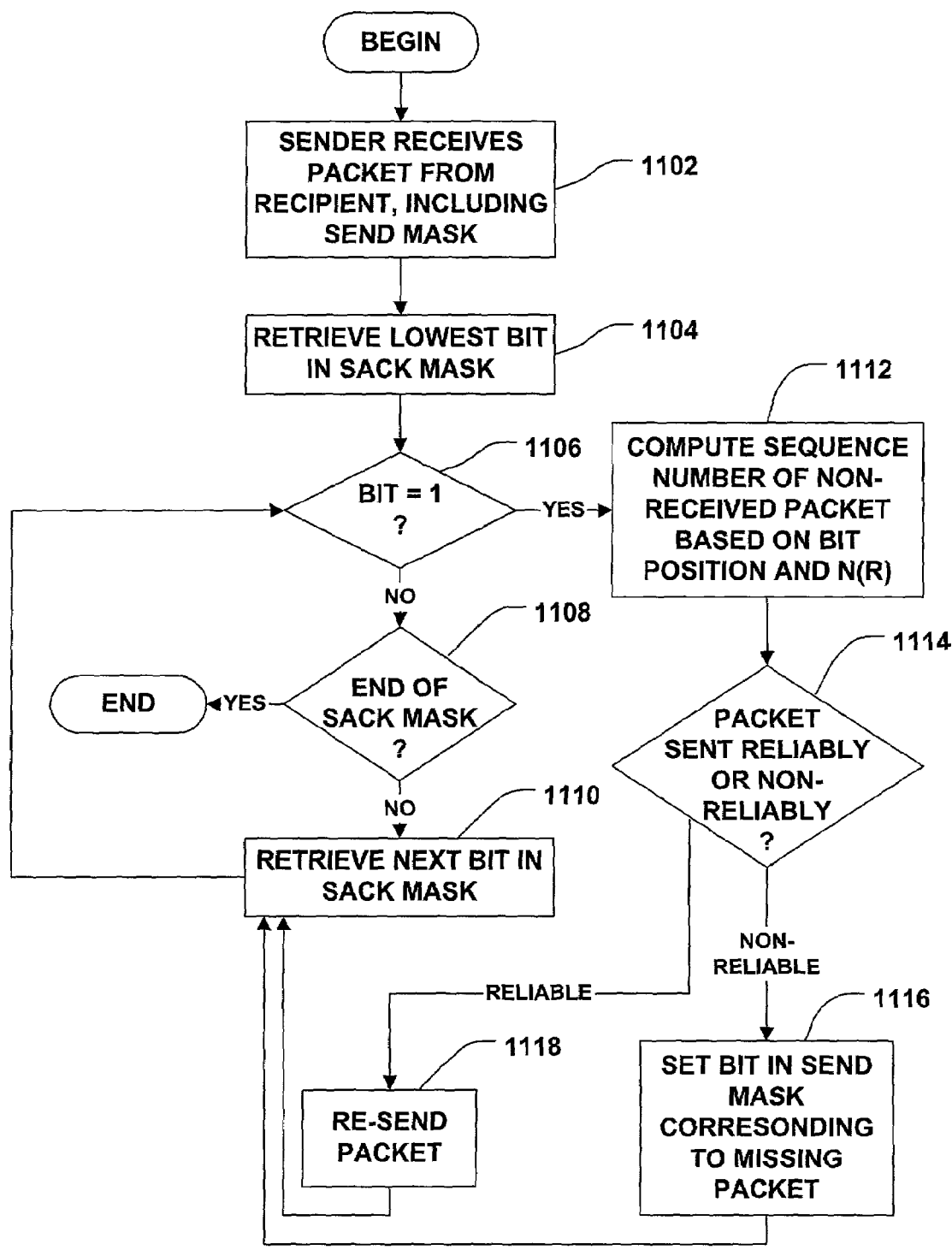
FIG. 11 is a flow diagram of an exemplary process of receiving and responding to a selective acknowledgment mask.

As described above, a recipient of packets may selectively acknowledge the receipt of packets using one or more SACK masks. Once a packet containing such SACK masks has been generated and received by the sender, the sender must process the packet and respond accordingly. The sender determines, based on the received SACK mask and the value of N(R) contained in the packets, which packets the recipient did not receive. Non-received packets that were sent reliably are re-sent to the recipient. Non-received packets that were sent non-reliably are indicated in SEND masks 570 and/or 580, which are sent to the recipient to notify the recipient that the non-received packets were non-reliable and need not be re-sent. FIG. 11 shows an exemplary process for receiving, and responding to, a SACK mask.

At step 1102, the sender receives a packet from the recipient that contains acknowledgment information. The packet contains at least: (a) a value of N(R), and (b) one or more SACK masks 550 and/or 560. At step 1104, the sender retrieves the lowest-order bit in the SACK mask (e.g., the right-most bit in SACK mask 550, shown as bit 802(0) in FIG. 8). At step 1106, the sender determines whether the value of the retrieved bit is equal to one. (It will be recalled that a "one" bit indicates a non-received packet, and a "zero" bit indicates a received packet.) If the value of the retrieved bit is equal to one, the process continues to step 1112.

At step 1112, the sequence number of the non-received packet is computed based on the position of the retrieved bit in the SACK mask and the value of N(R). As will be recalled from the discussion above, in a preferred embodiment if bit_position is the position of the current bit in the SACK mask then N(R)+bit_position+1 is the sequence number of the packet that corresponds to the current bit. Thus, the fact that the current bit was determined at step 1106 to be a "one" means that the packet having sequence number N(R)+bit_position+1 was not received by the recipient. It will be understood at this juncture that, inasmuch as there may be two SACK masks, the bit_position must take into account whether the SACK mask currently being looked at is the first SACK mask 550 or the second SACK mask 560. That is, in first SACK mask 550, the right-most bit 802(0) may have a bit_position of zero. If first SACK mask 550 has 32 bits (having bit_positions of zero through 31), then the right most bit in second SACK mask 560 may have a bit_position of 32, so the bits in SACK mask 560 have bit_positions of 32 through 63. Thus, the two exemplary 32-bit SACK masks 550 and 560 can be interpreted as corresponding to a single, unbroken sequence of 64 packets, notwithstanding the fact that the SACK masks are represented in the packet header as two, separate four-byte words.

Once the packet corresponding to the retrieved bit is identified, a determination is made at step 1114 as to whether the packet is reliable or non-reliable. If the packet is reliable, then the packet is re-sent to the recipient (step 1118). If the packet is non-reliable, then a bit is set in a SEND mask 570 and/or 580 that corresponds to the non-reliable packet (step 1116). Bits in a SEND mask correspond to packets according to a formula similar to that used to construct and interpret SACK masks, except using N(S) as the starting point and reaching backwards in the packet sequence from N(S): N(S)–bit_offset–1 is the sequence number of the packet that corresponds to a particular bit_offset. The SEND mask created at step 1116 is later sent to the recipient in a packet, whose control byte 520 will indicate the presence of one or two SEND masks with flags 704 and 705.

Returning now to step 1106, if step 1106 results in a determination that the current bit in the SACK mask does not equal one, then the process continues to step 1108. At step 1108, it is determined whether the end of the SACK mask has been reached (or the end of the second SACK mask, in the case where flag 703 indicates the presence of a second SACK mask). If the end of the SACK mask has been reached, then the process ends, as the sender has processed all acknowledgment information contained in the packet received at step 1102. On the other hand, if the end of the SACK mask has not been reached, the next bit in the SACK mask is retrieved (step 1110). Where the SACK mask has the exemplary structure shown in FIG. 8, the "next" bit in the SACK mask is one bit to the left of the current bit. It will be understood that where two SACK masks are present, if the current bit is at the end of the first SACK mask 550 (e.g., bit 802(31), in FIG. 8), then the "next" bit in the SACK mask means the first bit in the second SACK mask (e.g., the right-most bit in SACK mask 560). After the next bit in the SACK mask is retrieved, the process returns to step 1106 to evaluate the newly-retrieved bit.

It should also be noted that after a packet is either re-sent (step 1118), or flagged in a SEND mask (step 1116), the process continues to step 1108, where either the end of the SACK mask is detected, or the next bit in the SACK mask is retrieved.

Processing of Accounting for Missing Packets

Figure 12:
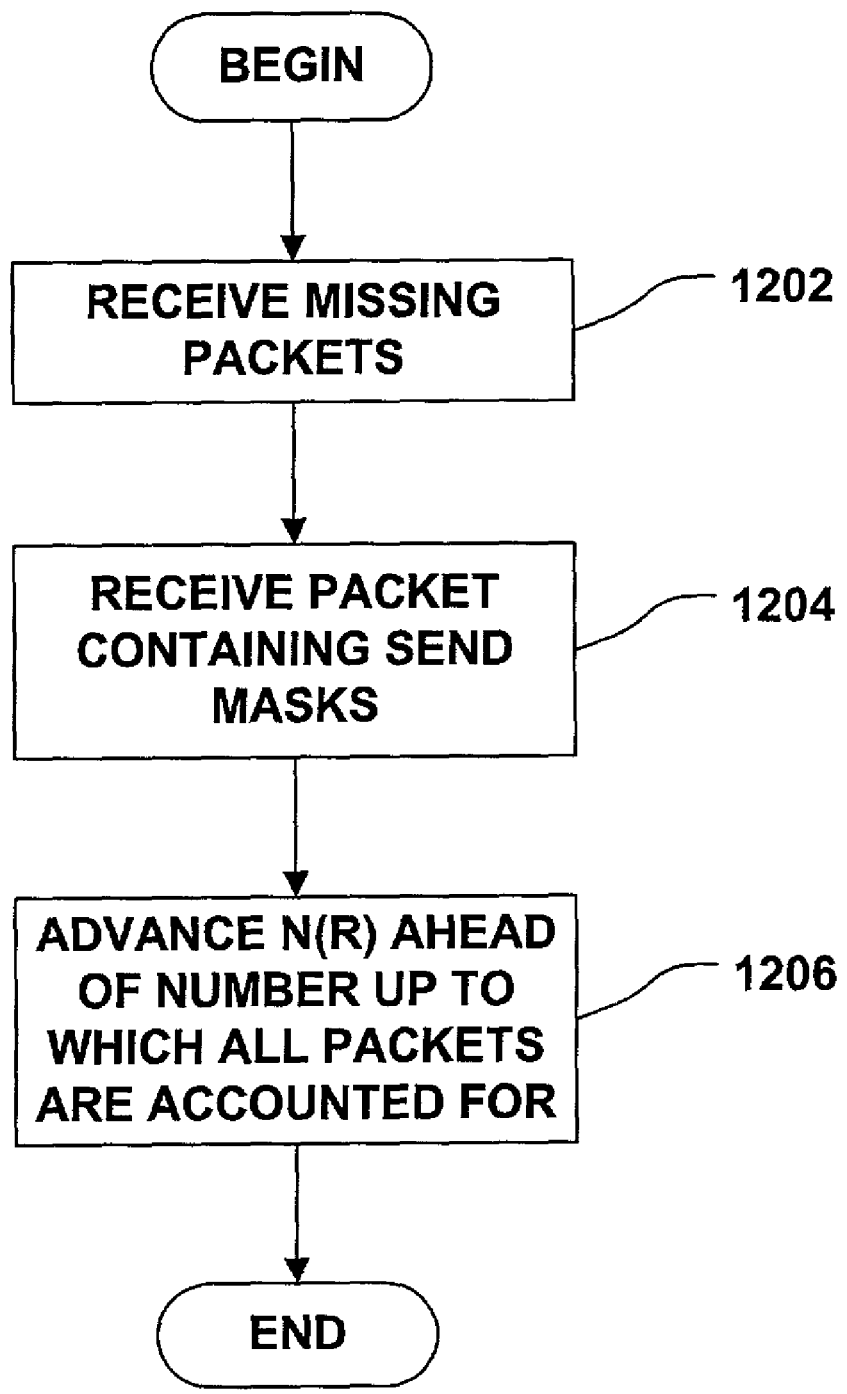
FIG. 12 is a flow diagram of an exemplary process of accounting for missing packets.

As noted above, the sender performs the process shown in FIG. 11 in order to respond to the recipient's selective acknowledgment of the receipt of packets. In the case of missing reliable packets, the response comprises re-sending the packet. In the case of missing non-reliable packets, the response comprises sending a packet that includes a SEND mask indicative of the non-reliable packets. FIG. 12 shows a process whereby the recipient uses this information to account for missing packets.

At step 1202, the recipient receives the re-sent missing packets. These re-sent packets are the packets that the sender re-sent at step 1118 of FIG. 11. At step 1204, the recipient receives a packet containing one or more SEND masks. The SEND mask(s) are the send mask(s) generated at step 1116 of FIG. 11. It should be noted that steps 1202 and 1204 are not necessarily performed in the order shown. For example, a packet containing a SEND mask may be received prior to a re-sent missing packet. Alternatively, the recipient may receive some missing packets (step 1202), a packet containing a SEND mask (step 1204), and then some more missing packets (back to step 1202). Moreover, since the SEND mask is a feature of a packet header, a re-sent packet may contain a SEND mask, in which case steps 1202 and 1204 are performed as a single action.

At step 1206, the recipient evaluates which packets have been received (in view of the receipt of re-sent packets), and which packets have been accounted for in the SEND mask (s) as non-reliable packets that will not be re-sent. Based on this evaluation, the recipient advances the value of N(R) such that N(R) is equal to the highest sequence number below which all packets have either been received or accounted for.

Processing Sequenced and Non-Sequenced Packets

Figure 13:
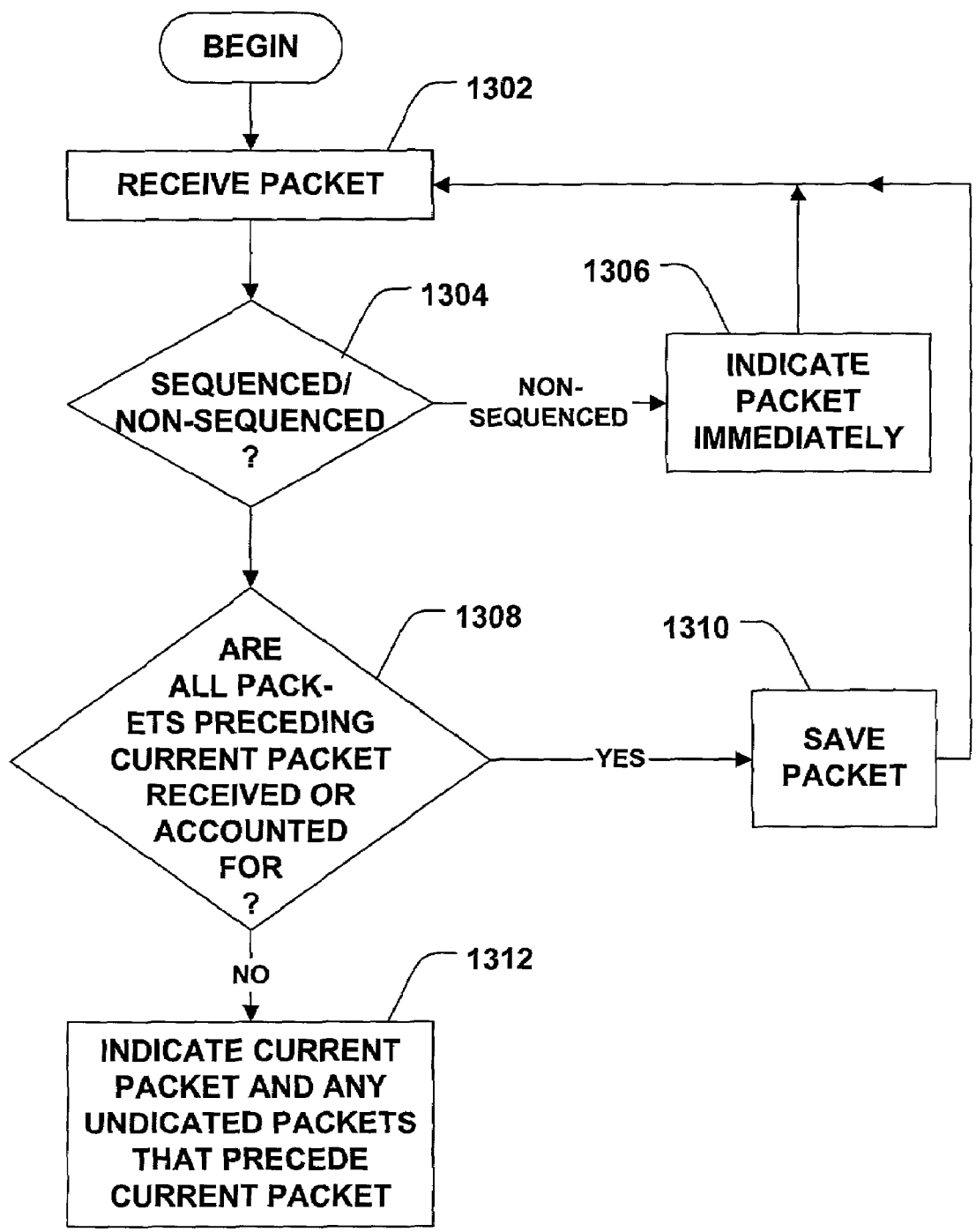
FIG. 13 is a flow diagram of an exemplary process of receiving sequenced and non-sequenced packets.

According to a feature of the invention, it is possible to send both sequenced and non-sequenced packets using the same protocol. As noted above, "sequenced" packets are packets that the protocol engine will not indicate to its caller out-of-sequence. That is, the protocol engine saves packets received out of sequence until all preceding packets in the sequence have been received, at which time the protocol engine presents the entire sequence of packets to the caller in order (except that non-reliable sequenced packets that have been indicated in a SEND mask are not presented to the caller). "Non-sequenced" packets are packets that the protocol engine indicates to the caller without regard to any ordering of the packets. As noted above, the header of packet 500 allows the sender to specify a packet as either sequenced or non-sequenced using bit 602 of the command byte 510. FIG. 13 shows a process executed by the recipient in order to process both sequenced and non-sequenced packets.

At step 1302, the recipient receives a packet 500. At step 1304, a determination is made as to whether a packet is sequenced or non-sequenced. This determination can be made by examining bit 602 of command byte 510 in the header of packet 500. If step 1304 results in a determination that the packet is non-sequenced, then the protocol engine indicates the packet to its caller immediately. The process then returns to step 1302 to receive another packet.

If step 1304 results in a determination that the received packet is sequenced, then the process continues to step 1308, at which it is determined whether all packets preceding the current packet have been received or accounted for. The order of the packets, and thus the identity of "preceding" packets, is determined by the sequence number N(S) 530, which is contained in the packet. If there are packets preceding the current packet that have not been received or accounted for, then the protocol engine saves the packet at step 1310, and returns to step 1302 to receive another packet.

If it is determined at step 1308 that all packets preceding the current packet have been received or accounted for, then the process continues to step 1312. At step 1312, the protocol engine indicates to its caller the current packet as well as all packets that precede the current packet and have not yet been indicated to the caller.

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed is:

1. A method of sending first and second data from a first computing device to a second computing device remote from the first computing device, the first computing device and second computing device being communicatively connected by a network, the method comprising:
   at said first computing device, creating a first packet which includes the first data and a first flag which indicates that said first packet is to be sent reliably;
   at said first computing device, creating a second packet which includes the second data and a second flag which indicates that said second packet is to be sent non-reliably;
   sending said first packet from the first computing device to the second computing device using the network;
   determining that a first number of packets that have been sent from the first computing device to the second computing device and for which acknowledgement has not been received by the first computing device does not exceed a second number; and
   sending said second packet from the first computing device to the second computing device using the network.

2. The method of claim 1, further comprising:
   at the first computing device, receiving receipt-indication data which indicates that said first packet was not received;
   determining that said first packet was sent reliably; and
   re-sending said first packet from the first computing device to the second computing device.

3. The method of claim 2, wherein said first packet includes a first sequence number, wherein said receiving receipt-indication data which indicates that said first packet was not received includes:
   receiving a second sequence number and a mask, said mask having a plurality of bits, each of said bits having an offset from a reference position in said mask, a specific bit from among said bits having a value of one, said specific bit from among said bits having a first offset from said reference position which corresponds to a second offset of said first sequence number from said second sequence number.

4. The method of claim 1, further comprising:
   at the first computing device, receiving receipt-indication data which indicates that said second packet was not received;
   determining that said second packet was sent non-reliably; and
   sending, from the first computing device to the second computing device, a message which indicates that said second packet will not be re-sent.

5. The method of claim 4, wherein said second packet includes a first sequence number, wherein said receiving receipt-indication data which indicates that said second packet was not received includes:
   receiving a second sequence number and a mask, said mask having a plurality of bits, each of said bits having an offset from a reference position in said mask, a specific bit from among said bits having a value of one, said specific bit from among said bits having a first offset from said reference position which corresponds to a second offset of said first sequence number from said second sequence number.

6. The method of claim 1, wherein said first packet comprises (a) a first header which includes said first flag, and (b) a body which includes the first data, and wherein said second packet comprises (a) a second header which includes said second flag, and (b) a body which includes the second data.

7. The method of claim 1, further comprising:
   initializing a sequence number counter; and
   incrementing said sequence number counter upon creation of a packet; wherein said creation of said first packet comprises including a current value of said sequence number counter in said first packet and wherein said creation of said second packet comprises including said current value of said sequence number counter in said second packet.

8. The method of claim 1, further comprising:
   receiving, at the first computing device, an acknowledgment that said first packet and said second packet have each been received by the second computing device.

9. A method of participating in communications with a first computing device, the method comprising:
   at a second computing device remote from the first computing device, receiving a plurality of first packets, each of said packets including a sequence number;
   at said second computing device, determining, based on said sequence numbers included in said plurality of first packets, that a second packet sent by the first computing device has not been received by the second computing device;
   at said second computing device, sending to the first computing device an indication that said second packet has not been received, said indication comprising:
      a reference number which is higher than or equal to a sequence number of said second packet; and
      a mask having a plurality of bits which indicates, relative to said reference number, a sequence number of said second packet.

10. The method of claim 9, wherein each of said bits is located at an n-th offset into said mask, a lowest-order bit in the mask having a zero-th offset, and wherein a bit in said mask at an m-th offset is equal to one, m being equal to the sequence number of said second packet minus said reference number minus one.

11. The method of claim 9, wherein said reference number comprises an eight-bit number.

12. The method of claim 9, wherein said mask comprises a 32-bit data element.

13. The method of claim 9, wherein said indication further comprises a second mask having a plurality of bits which indicates, relative to said reference number, packets having sequence numbers more than a first number greater than said reference number, and wherein the sequence number of said second packet is greater than said first number.

14. A method of communicating with a computing device comprising:
   sending to the computing device a first packet which includes: (a) first data, and (b) an indication that said first packet is to be sent reliably;
   sending to the computing device a second packet which includes: (a) second data, and (b) an indication that said second packet is to be sent non-reliably;
   receiving from the computing device an indication that said first packet and said second packet have not been received by the computing device;

re-sending said first packet to the computing device; and
sending to the computing device an indication that said second packet will not be re-sent.

15. The method of claim 14, wherein said first packet comprises a header which includes a command byte having a plurality of bits, a first of said plurality of bits comprising the indication that said first packet is to be sent reliably.

16. The method of claim 14, wherein said second packet has a sequence number associated therewith, and wherein said sending an indication that said second packet will not be re-sent comprises:
  creating a third packet which includes:
    a reference number;
    a control byte having a plurality of bits, one or more of said plurality of bits indicating the presence in said third packet of one or more masks;
    a mask having a plurality of bits, each of said bits corresponding to a packet sequence number relative to said reference number, the bit corresponding to the sequence number of said second packet indicating that said second packet will not be re-sent.

17. A device for communicating data in a computer network which connects the device to one or more remote devices, the device comprising:
  a processor which executes computer-executable instructions;
  a memory communicatively coupled to said processor, said memory storing:
    first logic executable on said processor which receives (a) first data, (b) an indication of whether said first data is to be transmitted reliably or non-reliably, and (c) an identifier of a first one of the remote devices to which said first data is to be sent;
    a sequence counter;
    second logic executable on said processor which creates a package including (a) said first data, (b) second data indicative of said indication, and (c) a current value of said sequence counter, and which increments said sequence counter upon creation of said package;
  a network interface which communicates said package to said first one of the remote devices over the computer network and which receives from said first one of the remote devices a selective acknowledgment indicative of whether said package has been received by said first one of the remote devices, said network interface being communicatively coupled to said memory and to the computer network;
  said memory further storing:
    third logic executable on said processor which creates a response that includes either (a) said first data, or (b) a message that said first data will not be re-sent, according to whether indication indicates reliable or non-reliable transmission of said first data.

18. The device of claim 17, wherein said message that said first data will not be re-sent comprises:
  a reference number;
  a mask having a plurality of bits, each of said bits corresponding to a sequence counter value relative to said reference number, wherein a one of said bits that corresponds to the sequence counter value of said package has a bit value which indicates that said first data will not be re-sent.

19. The device of claim 17, wherein said selective acknowledgment comprises:
  a reference number;
  a mask having a plurality of bits, each of said bits corresponding to a sequence counter value relative to said reference number, wherein a one of said bits that corresponds to the sequence counter value of said package has a bit value which indicates whether said package has been received by said first one of the remote devices.

20. A computer-readable storage medium having computer-executable instructions to perform a method of sending first and second data from a first computing device to a second computing device remote from the first computing device, the first computing device and second computing device being communicatively connected by a network, the method comprising:
  at said first computing device, creating a first packet which includes the first data and a first flag which indicates that said first packet is to be sent reliably;
  at said first computing device, creating a second packet which includes the second data and a second flag which indicates that said second packet is to be sent non-reliably;
  sending said first packet from the first computing device to the second computing device using the network;
  determining that a first number of packets that have been sent from the first computing device to the second computing and for which acknowledgement has not been received by the first computing device does not exceed a second number; and
  sending said second packet from the first computing device to the second computing device using the network.

21. A computer-readable storage medium having computer-executable instructions to perform a method of participating in communications with a first computing device, the method comprising:
  at a second computing device remote from the first computing device, receiving a plurality of first packets, each of said packets including a sequence number;
  at said second computing device, determining, based on respective sequence numbers of said sequence numbers included in said plurality of first packets, that a second packet sent by the first computing device has not been received by the second computing device;
  at said second computing device, sending to the first computing device an indication that said second packet has not been received, said indication comprising:
    a reference number which is higher than or equal to a sequence number of said second packet; and
    a mask having a plurality of bits which indicates, relative to said reference number, a sequence number of said second packet.

22. A computer-readable storage medium having computer-executable instructions to perform a method of communicating with a computing device, the method comprising:
  sending to the computing device a first packet which includes: (a) first data, and (b) an indication that said first packet is to be sent reliably;
  sending to the computing device a second packet which includes: (a) second data, and (b) an indication that said second packet is to be sent non-reliably;
  receiving from the computing device an indication that said first packet and said second packet have not been received by the computing device;
  re-sending said first packet to the computing device; and
  sending to the computing device an indication that said second packet will not be re-sent.

* * * * *